United States Patent
Pateel

(10) Patent No.: US 10,573,092 B2
(45) Date of Patent: Feb. 25, 2020

(54) REAL-TIME REMOTE VISUALIZATION OF FRAME DAMAGE FROM FIELD DATA

(71) Applicant: Caterpillar Inc., Peoria, IL (US)

(72) Inventor: Vamsikrishna Pateel, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 545 days.

(21) Appl. No.: 15/274,455

(22) Filed: Sep. 23, 2016

(65) Prior Publication Data

US 2018/0089345 A1    Mar. 29, 2018

(51) Int. Cl.
*G07C 5/08* (2006.01)
*G07C 5/00* (2006.01)
*G01M 5/00* (2006.01)

(52) U.S. Cl.
CPC ............. *G07C 5/00* (2013.01); *G01M 5/0041* (2013.01); *G01M 5/0083* (2013.01); *G07C 5/08* (2013.01)

(58) Field of Classification Search
CPC .. G07C 5/00; G07C 5/08; G01M 5/00; G01M 5/0083; G01M 5/0041
USPC ....................................................... 703/8, 7
See application file for complete search history.

(56) References Cited

U.S. PATENT DOCUMENTS

| | | | | |
|---|---|---|---|---|
| 4,839,835 A * | 6/1989 | Hagenbuch | ............... | G08G 1/20 702/174 |
| 5,531,122 A * | 7/1996 | Chatham | .................. | G01B 5/30 340/438 |
| 6,184,784 B1 * | 2/2001 | Shibuya | ............... | B60C 23/0408 180/167 |
| 7,171,344 B2 * | 1/2007 | Lind | .................... | G06F 17/5009 700/98 |
| 7,328,625 B2 * | 2/2008 | Sundermeyer | ........... | G01N 3/32 73/806 |
| 7,376,519 B2 * | 5/2008 | Morin | .................. | G01N 29/043 702/33 |
| 2005/0017602 A1 | 1/2005 | Arms et al. | | |
| 2006/0243056 A1 * | 11/2006 | Sundermeyer | ........... | G01N 3/32 73/760 |
| 2013/0073151 A1 * | 3/2013 | Wada | ...................... | E02F 3/434 701/50 |

OTHER PUBLICATIONS

Hajela and Soeiro, "Structural Damage Detection Based on Static and Modal Analysis", Jun. 1990, AIAA Journal, vol. 28, pp. 1110-1115.*

* cited by examiner

*Primary Examiner* — Juan C Ochoa
(74) *Attorney, Agent, or Firm* — Miller, Matthias & Hull

(57) ABSTRACT

A visualization system for visualizing structural integrity of a frame is provided. The visualization system may include a monitoring device having one or more sensors coupled to the frame, and a workstation in communication with the one or more sensors. The sensors may be configured to measure field damage data. The workstation may include a display device, an analytical model database storing model damage data, and a controller. The controller may be configured to receive the field damage data from the sensors, receive the model damage data from the analytical model database, generate an events log based on the field damage data and the model damage data, map the model damage data to a visual model of the frame based on the events log, and display the visual model of the frame on the display device.

20 Claims, 6 Drawing Sheets

| Field Damage Data Per Work Cycle/Duration ||
|---|---|
| Locations | Damage |
| [Test Location 1] | [Measured Damage Value 1] |
| [Test Location 2] | [Measured Damage Value 2] |
| [Test Location 3] | [Measured Damage Value 3] |
| [Test Location 4] | [Measured Damage Value 4] |
| [Test Location 5] | [Measured Damage Value 5] |
| ... | ... |

FIG. 4

| Model Damage Data - Location 1 ||
|---|---|
| Events | Damage |
| [Event 1] | [Theoretical Damage Value 1-1] |
| [Event 2] | [Theoretical Damage Value 1-2] |
| [Event 3] | |
| [Event 4] | |
| [Event 5] | |
| ... | |

| Model Damage Data - Location 2 ||
|---|---|
| Events | Damage |
| [Event 1] | [Theoretical Damage Value 2-1] |
| [Event 2] | [Theoretical Damage Value 2-2] |
| [Event 3] | [Theoretical Damage Value 2-3] |
| [Event 4] | [Theoretical Damage Value 2-4] |
| [Event 5] | [Theoretical Damage Value 2-5] |
| ... | ... |

FIG. 5

| Event Log - Events Per Work Cycle/Duration ||
|---|---|
| Events | Event Coefficients |
| [Event 1] | [Number of Occurrences] |
| [Event 2] | [Number of Occurrences] |
| [Event 3] | [Number of Occurrences] |
| [Event 4] | [Number of Occurrences] |
| [Event 5] | [Number of Occurrences] |
| ... | ... |

FIG. 6

REAL-TIME REMOTE VISUALIZATION OF FRAME DAMAGE FROM FIELD DATA

TECHNICAL FIELD

The present disclosure relates generally to monitoring systems, and more particularly, to systems and methods for visualizing the structural integrity of frames in machines.

BACKGROUND

Machines, such as off-highway trucks, tractors, dozers, loaders, earth moving equipment, or other construction machines, may have any number of structural components that are subject to fatigue damage which could lead to structural failures. One method for monitoring fatigue damage on a machine structure is to perform manual and/or visual inspections. However, such a method may be impractical for several reasons. For instance, adequate assessment may not be possible for structural components that are concealed or difficult to physically or visually access. Comprehensive assessment would also require substantial downtime and adversely impact productivity. Furthermore, manual inspections cannot easily account for cumulative wear or damage, or provide prognostic information which can be helpful in scheduling maintenance, repairs, and the like.

Some conventional techniques incorporate visual models of structural components which can be used to provide theoretical insight of damage or weak points of a machine frame. However, such techniques are based solely on theoretical events and do not account for the actual wear experienced in the field. Other conventional techniques employ gauges that can be placed on structures to electronically monitor various loads, strains and/or stress on the structure. Although such systems can be used to assess actual impacts on a machine frame, the data collected is discrete and localized, and thereby it fails to provide a comprehensive assessment of the entire frame. Furthermore, any comprehensive analysis of a frame based on such localized data fails to be updated frequently enough to enable real-time monitoring.

In one example, U.S. Pub. No. 2005/0017602 (the '602 publication) discloses a system configured to monitor structural fatigue based on peak strain or strain accumulation. Specifically, the '602 publication discloses wireless nodes having strain sensing devices that are configured to monitor strain and process strain data at the site of measurement. Although the '602 publication discloses a system that may be configured to monitor various aspects of fatigue, the data collected in the '602 publication is limited to discrete points of a given structural component, and thereby fails to be comprehensive of the entire component. The '602 publication similarly does not provide a comprehensive assessment of the entire component that can be updated frequently or on demand, such as in real-time, and in a cumulative manner.

In view of the foregoing disadvantages associated with conventional systems, a need exists for a solution which not only tracks the individual strains or damage actually experienced in the field, but also tracks the effect of those strains or damage on the entire machine frame. Moreover, there is a need for systems and methods that are capable of incorporating both field data as well as model data to provide a visual assessment of the entire machine frame. There is also a need for monitoring techniques that can provide both comprehensive as well as cumulative assessments of the machine frame that can be progressively and frequently updated. Furthermore, there is also a need to monitor information sufficient to provide reliable diagnostic and prognostic assessments of the machine frame.

SUMMARY OF THE DISCLOSURE

In one aspect of the present disclosure, a visualization system for visualizing structural integrity of a frame is provided. The visualization system may include a monitoring device having one or more sensors coupled to the frame and a workstation in communication with the one or more sensors. The one or more sensors may be configured to measure field damage data. The workstation may include a display device, an analytical model database storing model damage data, and a controller. The controller may be configured to receive the field damage data from the one or more sensors, receive the model damage data from the analytical model database, generate an events log based on the field damage data and the model damage data, map the model damage data to a visual model of the frame based on the events log, and display the visual model of the frame on the display device.

In another aspect of the present disclosure, a controller for visualizing structural integrity of a frame is provided. The controller may include a field data module configured to receive field damage data from one or more sensors coupled to the frame, a model data module configured to receive model damage data from an analytical model database, an optimization module configured to generate an events log based on the field damage data and the model damage data, and a compiler module configured to map the model damage data to a visual model of the frame based on the events log.

In yet another aspect of the present disclosure, a method of visualizing structural integrity of a frame is provided. The method may receive field damage data from one or more sensors coupled to the frame, receive model damage data from an analytical model database, optimize the model damage data based on the field damage data, generate an events log based on the field damage data and the model damage data, compile a plurality of visual files of the model damage data based on the events log, and map the model damage data to a visual model of the frame.

These and other aspects and features will be more readily understood when reading the following detailed description in conjunction with the accompanying drawings.

BRIEF DESCRIPTION OF THE DRAWINGS

FIG. 4 is a tabular view of exemplary field damage data that may be received by the present disclosure;

FIG. 5 is a tabular view of exemplary model damage data that may be received by the present disclosure;

FIG. 6 is a tabular view of exemplary of an events log and event coefficients that may be generated by the present disclosure;

While the following detailed description is given with respect to certain illustrative embodiments, it is to be understood that such embodiments are not to be construed as limiting, but rather the present disclosure is entitled to a scope of protection consistent with all embodiments, modifications, alternative constructions, and equivalents thereto.

DETAILED DESCRIPTION

Figure 1:
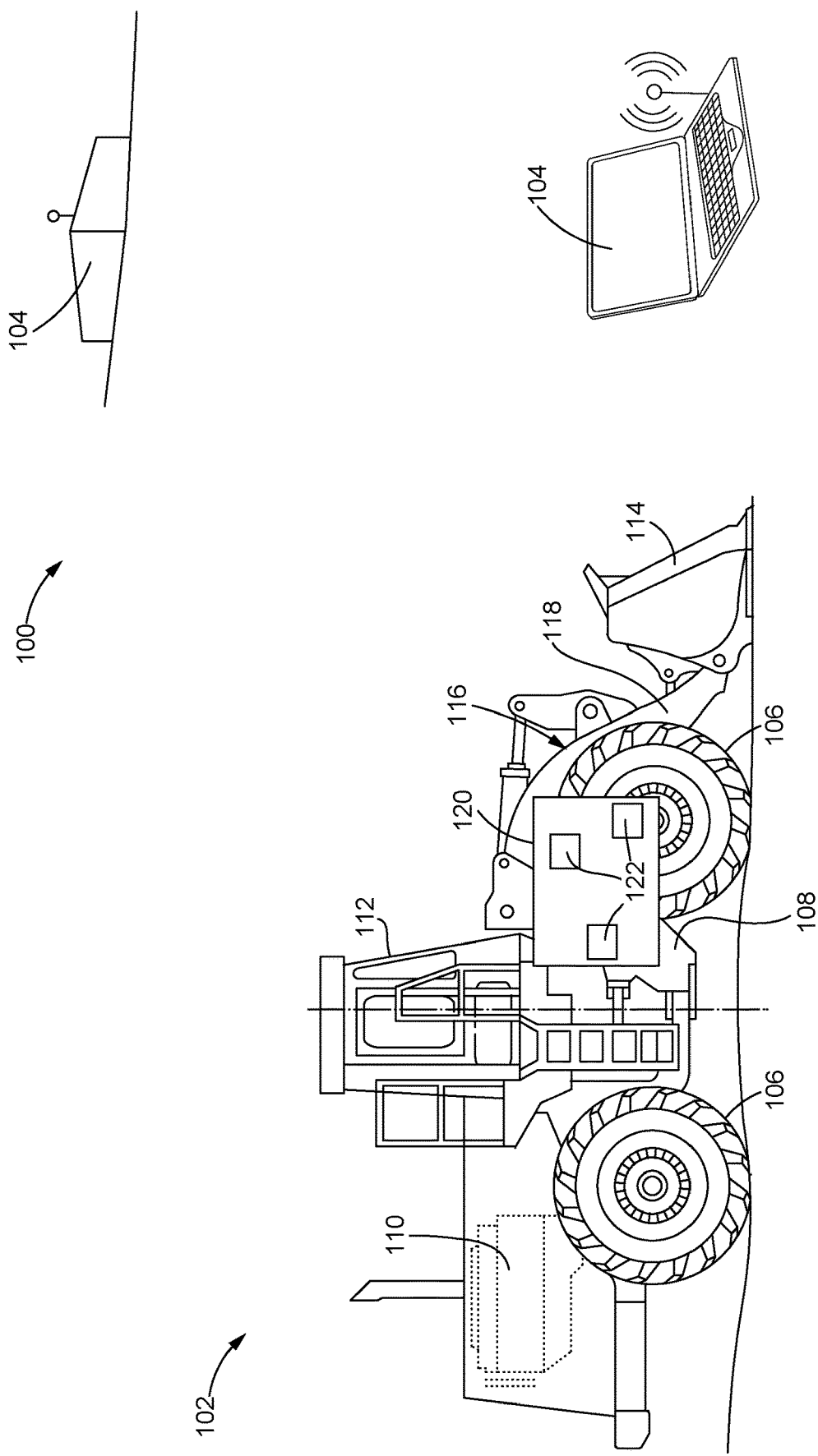
FIG. 1 is a schematic view of one exemplary visualization system of the present disclosure for monitoring the structural integrity of a frame of a machine.

Referring to FIG. 1, one exemplary visualization system 100 for monitoring or visualizing the structural integrity of one or more machine components is provided. As shown, the visualization system 100 may include one or more machines 102 and one or more workstations 104. In general, the machine 102 may include one or more traction devices 106 and a frame 108 which supports an engine 110, an operator cab 112, an implement 114, one or more structural components 116, such as lift arms 118 for supporting the implement 114 on the frame 108, and the like. Although depicted as a loader, the machine 102 may alternatively encompass on-highway trucks or vehicles, off-highway machines, earthmoving equipment or construction machines, such tractors, dozers, or any other machine with a frames 108 or structural components 116 to be monitored.

As shown in FIG. 1, the machine 102 also provides a monitoring device 120 which may include one or more sensors 122 that are positioned on or in proximity to the frame 108 and/or the structural components 116, and arranged to measure field damage data. The sensors 122 may include strain gauges, strain sensors, load sensors, or any other sensor configured to measure or detect the field damage data in terms of damage, strain, stress or load on the frame 108 and/or the structural components 116 of the machine 102 during a given work cycle or an operation. The monitoring device 120 may further electronically communicate the field strain or field damage data to one or more of the workstations 104, such as over one or more wired and/or wireless local area networks, wide area networks, satellite-based networks, and the like. Moreover, the monitoring device 120 may be configured to transmit the field damage data to any local or remote workstations 104 in real-time, at sensor sampling frequencies, or other appropriate intervals.

Figure 2:
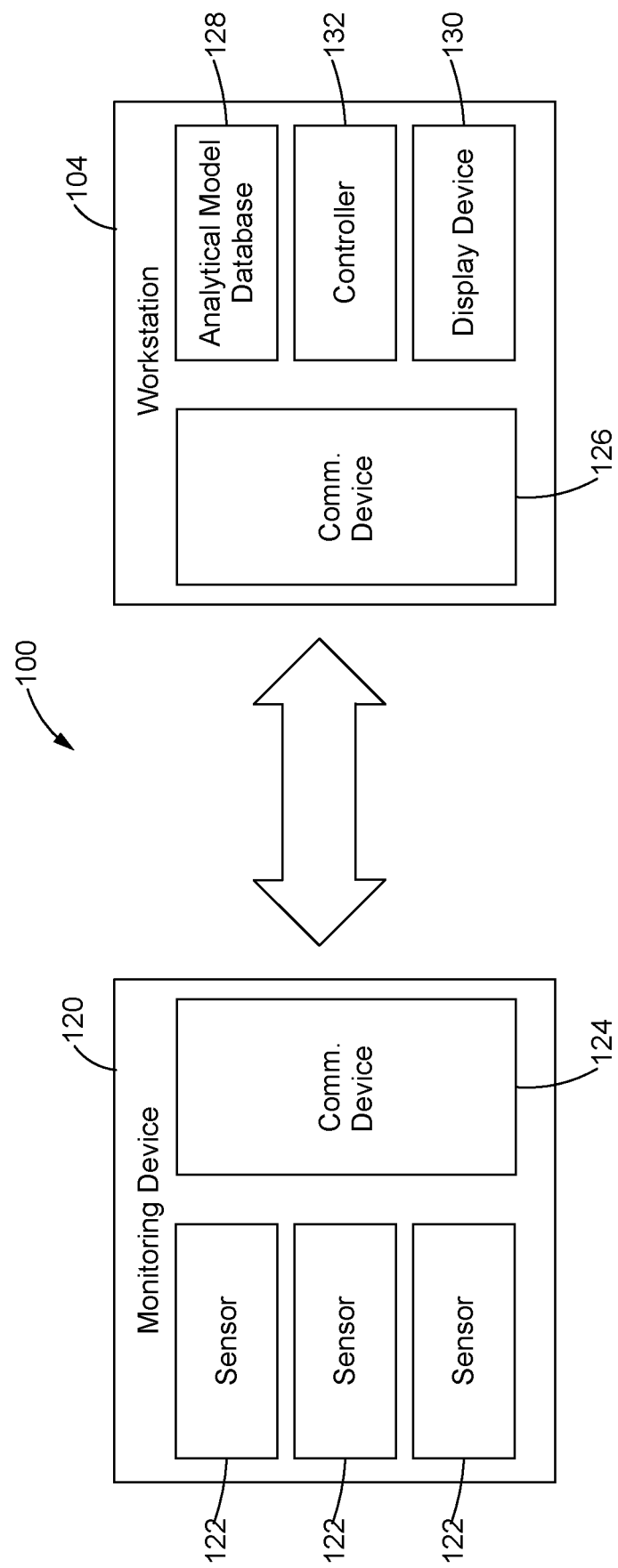
FIG. 2 is a diagrammatic view of another visualization system of the present disclosure.

As further shown in FIG. 2, the monitoring device 120 may include at least a communication device 124 enabling communications between the sensors 122 and one or more workstations 104. Each workstation 104 may include a corresponding communication device 126 configured to receive the field damage data collected by the sensors 122 on the machine 102. The communication devices 124, 126 may include antennas, transmitters, receivers, transceivers, or any other arrangement of hardware and/or software which enable the electronic exchange of information over wired and/or wireless communication links, such as satellite, cellular, radio, infrared, and the like. The workstation 104 also includes an analytical model database 128, a display device 130 and a controller 132 which collectively generate a visualization of the structural integrity of the frame 108 or other structural components 116 of the machine 102. Each workstation 104 may be implemented using desktop computers, laptops, mobile devices, smartphones, tablets, or the like, that are remotely or locally situated with respect to the machine 102 and specifically configured in accordance with the present disclosure. In other embodiments, any one or more of the analytical model database 128, the display device 130 and the controller 132 of the workstation 104 shown may be implemented on-board the machine 102 and/or within the monitoring device 120.

Still referring to FIG. 2, the controller 132 may communicate with the analytical model database 128 to retrieve model damage data, at predetermined locations of the frame 108 and the structural components 116 within the machine 102. Although theoretical, the model damage data and the structural assessments may be specific to the class, type, series, chassis or model of the machine 102 being monitored. The theoretical events reflected in the model damage data may also be specific to the machine 102 as well as work cycles typical for the machine 102 and its use. For example, the events may include operations, such as turning, cutting, loading, carrying, lifting, traversing inclines, dumping, racking and any other anticipated operation.

The analytical model database 128 in FIG. 2 may be locally disposed within a memory of the workstation 104, or remotely situated relative to the workstation 104 and accessible through one or more networks. The display device 130 may employ any graphical display technology suited to display two-dimensional images, three-dimensional models, color-coded images or models, and/or any other visual information indicative of the structural integrity of the frame 108 or structural components 116 of the machine 102 in real-time. Furthermore, the controller 132 may be implemented using one or more of a processor, a central processing unit (CPU), and any other suitable device for communicating with any one or more of the monitoring device 120, the sensors 122, the communication devices 124, 126, the analytical model database 128, the display device 130, and the like.

Figure 3:
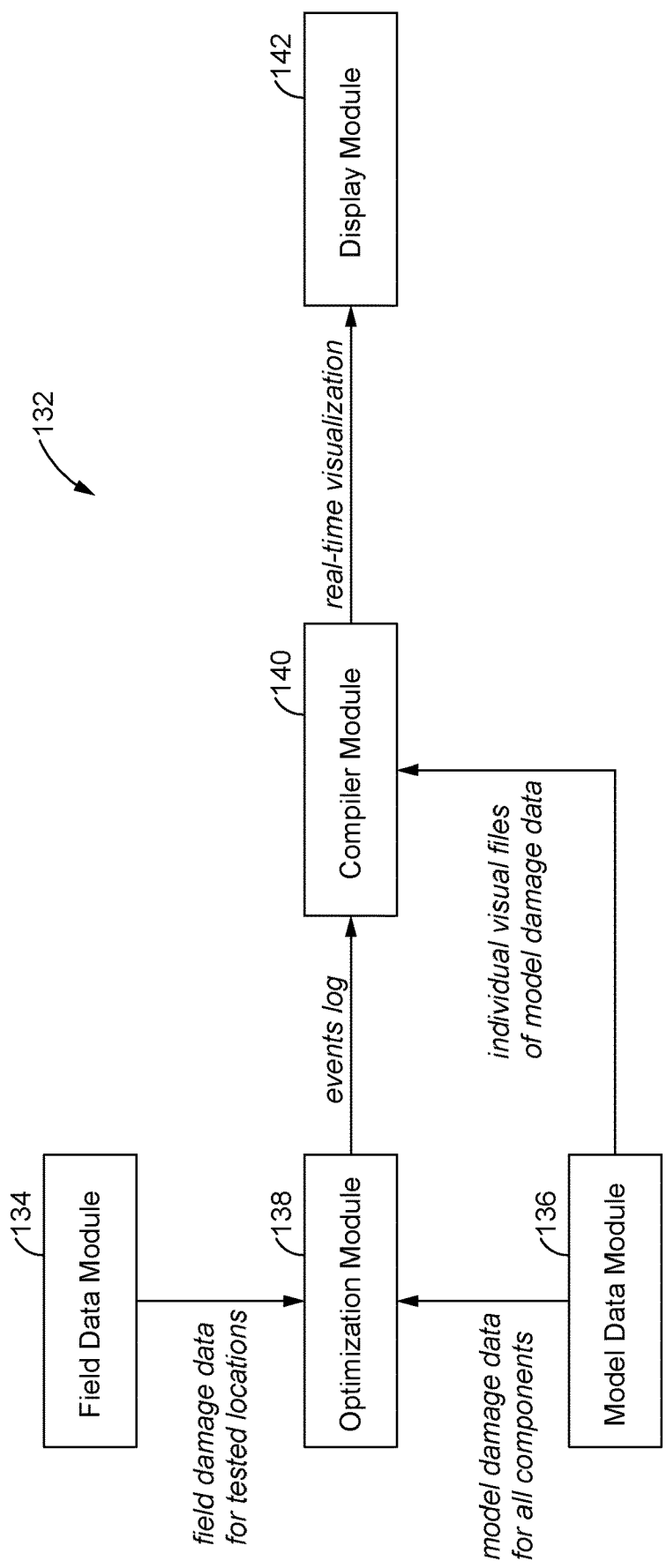
FIG. 3 is a diagrammatic view of one exemplary controller that may be used with the visualization system of the present disclosure.

Turning now to FIG. 3, one exemplary embodiment of a controller 132 that may be used with the visualization system 100 is diagrammatically provided. The controller 132 may be programmed or configured to operate according to predetermined algorithms or sets of logic instructions designed to manage one or more of the tasks or operations of the visualization system 100. More particularly, the controller 132 may be configured to communicate with the monitoring device 120 and one or more of the sensors 122 thereof, receive the field damage data from the sensors 122, receive the model damage data from the analytical model database 128, generate an events log based on the field damage data and the model damage data, map the model individual damage data to a visual model of the entire frame 108 of the machine 102 based on the events log, and display the visual model of the frame 108 and the structural integrity thereof on the display device 130.

As shown in FIG. 3, the controller 132 may be configured to function according to one or more preprogrammed algorithms, which may be generally categorized into, for example, a field data module 134, a model data module 136, an optimization module 138, a compiler module 140, and a display module 142. It will be understood that the arrangement of grouped code or logic instructions shown in FIG. 3 merely demonstrates one way to implement the functions of the visualization system 100, and that other arrangements will be apparent to those of ordinary skill in the art. Other embodiments, for instance, may modify, omit, merge and/or add to the modules shown in FIG. 3 and still produce comparable results.

Still referring to FIG. 3, the field data module 134 is configured to receive field damage data 144, as shown for example in FIG. 4, from one or more of the sensors 122 directly coupled to the frame 108 and/or indirectly coupled to the frame 108 via one or more structural components 116. For example, the field damage data 144 in FIG. 4 includes actual or measured strain values or damage values 146 detected at each tested location, or at each tested structural component 116 with a sensor 122 thereon, in a given work cycle. Moreover, the measured damage values 146 may be measured in units quantifying strain or damage per work cycle. Alternatively, the measured damage values 146 may be measured in units quantifying strain or damage per hour or some other durational period or interval. Furthermore, the measured damage values 146 may be unitless but nonetheless sufficient to quantify structural damage, wear or strain according to universally accepted standards.

The model data module 136 of FIG. 3 is configured to receive model damage data 148, as shown in FIG. 5 for example, from the analytical model database 128. As shown, the model damage data 148 may include theoretical damage values 150 predetermined for each of the structural components 116 associated with the frame 108 and for each of a plurality of possible events 152. More particularly, each event 152 may correspond to tasks or operations that a machine 102 may perform during a given work cycle and that may have some impact on the structural integrity of the frame 108. Each theoretical damage value 150 may represent the damage, stress or strain on a specific location or structural component 116 that is expected to result per occurrence of an event 152. The model damage data 148 and other data maintained in the analytical model database 128 may be obtained using simulated testing or modeling of the machine 102, the frame 108 and the structural components 116 thereof.

In addition, the optimization module 138 of FIG. 3 is configured to generate an events log 154, as shown for example in FIG. 6, based on the field damage data 144 and the model damage data 148. In particular, the optimization module 138 may employ genetic algorithms as is commonly understood in the art, or algorithms which employ natural selection processes to sort through complex combinations of variables and parameters, to optimize the model damage data 148. The model damage data 148 may be optimized by modifying, adjusting or otherwise customizing the general model damage data 148 to field damage data 144 that is specific to the machine 102 and/or work cycle. Moreover, the measured damage values 146 may be cross-referenced against the theoretical damage values 150 and corresponding events 152 to assess a list of events 152 that have likely occurred during the work cycle, and the corresponding number of times each of the events 152 likely occurred during the work cycle, or the event coefficients 156. The event coefficients 156 may be quantified in terms of occurrences per hour or per some other unit of time.

Figure 7:
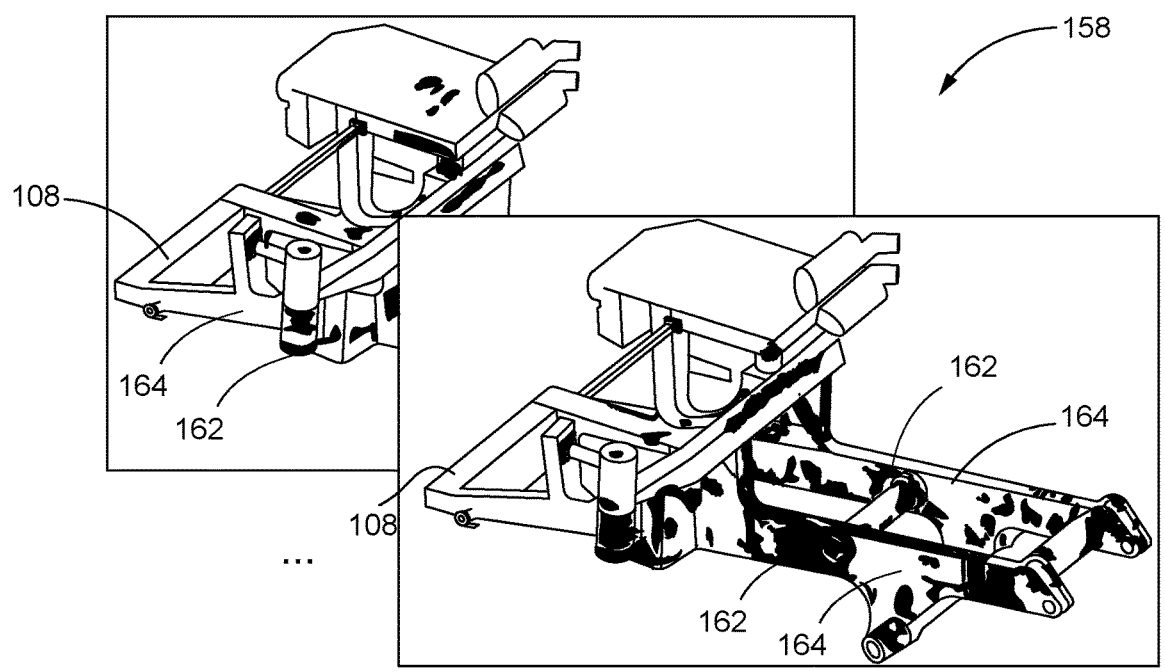
FIG. 7 is a graphical view of visual files depicting theoretical damage per occurrence of an event on individual locations or structural components of a machine.

Once the events log 154 has been determined, the compiler module 140 of FIG. 3 may map the model damage data 148 at one or more locations of a damage model of the entire frame 108. More specifically, the model damage data 148 may be represented as or further include a plurality of individual visual files 158, as shown for example in FIG. 7, depicting one or more of the theoretical damage values 150 for each of the events 152 in graphical format. The compiler module 140 may be configured to select and compile the relevant visual files 158 based on the events log 154 in order to generate a visual model 160 of the frame 108, as shown for example in FIG. 8. For example, data in the selected visual files 158 may be overlaid, superimposed, or otherwise image-processed to generate two-dimensional or three-dimensional visual models 160 of the frame 108. While other visual cues or schemes may be used, differences in the relative theoretical damage values 150 within the frame 108 may be indicated using a color-coded scheme. As shown for example in FIGS. 7 and 8, colored or darker areas 162 may depict higher levels of damage whereas transparent or lighter areas 164 may indicate lower levels of damage or no damage at all.

Figure 8:
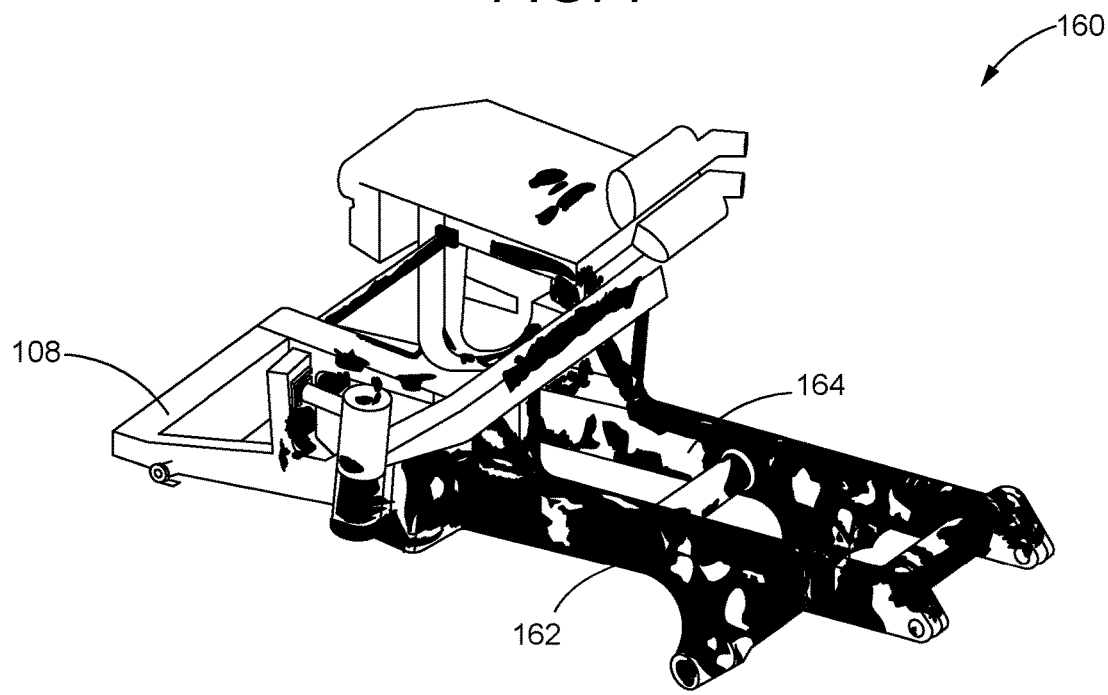
FIG. 8 is a graphical view of a visual model depicting damage of a frame of a machine constructed in accordance with the teachings of the present disclosure.

Furthermore, the display module 142 of FIG. 3 may be configured to display the visual model 160 on a display device 130 of any of the workstations 104 within the associated network. The display module 142 may also be configured to output the visual model 160 in varying formats and in varying degrees of complexity specifically compatible with different types of workstations 104. Although the visual model 160 in FIG. 8 is provided in a three-dimensional view and color-coded, it will be understood that the controller 132 may employ other views and coding schemes to provide a visualization of the frame 108 as well as the structural integrity thereof. Still further, the controller 132 may be configured to assess the measured damage values 146 and generate the visual model 160 in real-time, such as between approximately 2-3 hours of processing time for a frame 108.

INDUSTRIAL APPLICABILITY

In general, the present disclosure finds utility in various applications, such as on-highway trucks or vehicles, off-highway machines, earth-moving equipment, aerospace applications, and the like, and more particularly, provides an intuitive solution for monitoring the integrity of frames and other structural components of machines commonly subject to significant loads or stress. Specifically, the present disclosure employs analytical models which predict stress points and strain or damage levels in a frame, and genetic algorithms which fine tune the analytical models using real-time field data to provide machine-specific analyses. By using actual field data and creating real-time analyses, the present disclosure is able to create visual models of the frame that are much more accurate and informative. Also, by creating visual models, the present disclosure is able to make otherwise complex data and information much more comprehensive.

Figure 9:
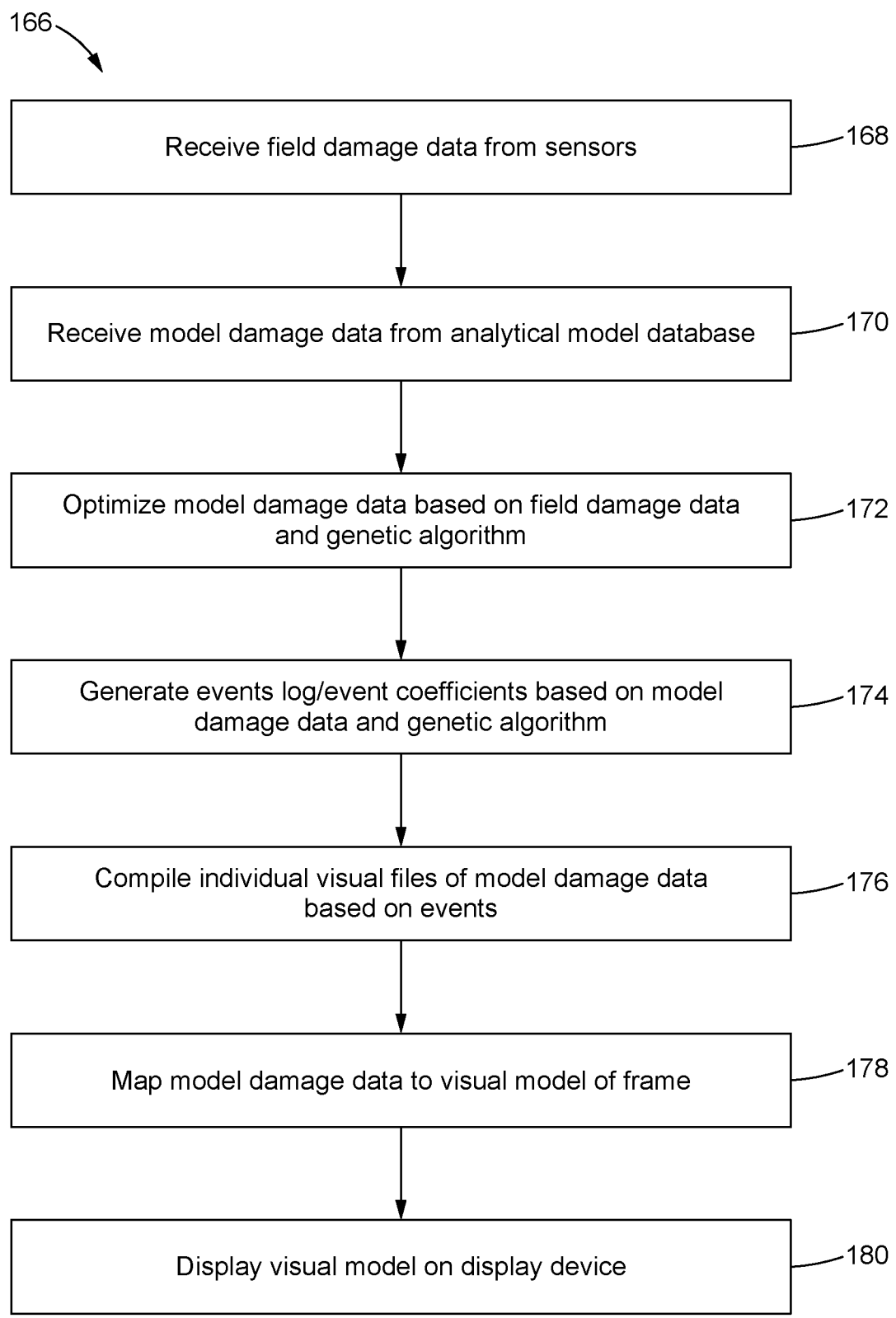
FIG. 9 is a flow diagram of one exemplary algorithm or method of visualizing the structural integrity of a frame of a machine.

Turning now to FIG. 9, one exemplary algorithm or method 166 of visualizing the structural integrity of a frame 108, or any structural component 116 of a machine 102, is provided. In particular, the method 166 may be implemented in the form of one or more algorithms, instructions, logic operations, or the like, and the individual processes thereof may be performed or initiated via the controller 132. The method 166 shown may initially determine whether a work cycle and/or a predefined duration is complete before acquiring or processing information. The method 166 may determine that a work cycle, a predefined duration or any other condition is complete based on any combination of data retrieved from the machine 102, engine 110, operator input, and the like. If completion of the work cycle or duration has not been identified, the method 166 may remain in a standby mode and continue monitoring for the appropriate conditions. If, however, a given work cycle or duration has been completed, the method 166 may proceed to visualize the frame 108. Alternatively, the method 166 may simply begin the routine shown without checking for completion of work cycles or durations.

As shown in FIG. 9, the method 166 in block 168 may receive the field damage data 144 from one or more of the sensors 122 coupled directly or indirectly to the frame 108. As shown for example in FIG. 4, the method 166 may receive field damage data 144 including measured damage values 146 for one or more structural components 116 associated with the frame 108 and collected during the given work cycle or duration. The method 166 in block 170 may further receive model damage data 148 from the analytical model database 128. As shown for example in FIG. 5, the model damage data 148 may include theoretical damage values 150 predetermined for each of the structural components 116 associated with the frame 108 and for each of a plurality of possible events 152. In other embodiments, the method 166 may receive the model damage data 148 prior to receiving the field damage data 144, or receive both of the field damage data 144 and the model damage data 148 simultaneously.

Still referring to FIG. 9, the method 166 in block 172 may optimize, or more particularly, approximate or equate, the model damage data 148 based on the field damage data 144. Specifically, the method 166 may employ a genetic algorithm, or algorithms which employ natural selection processes to sort through complex combinations of variables and parameters, to customize the model damage data 148 to the field damage data 144 and to the specific machine 102 being observed. Based on the optimized model damage data 148, the method 166 in block 174 may further generate an events log 154 and event coefficients 156, as shown for example in FIG. 6. In particular, the measured damage values 146 may be cross-referenced against the theoretical damage values 150 to determine a list of events 152 that have likely occurred during the work cycle, and the corresponding event coefficients 156, or the number of times each of the events 152 likely occurred during the work cycle.

Once the events log 154 has been determined, the method 166 of FIG. 9 may compile individual visual files 158 of the model damage data 148 in block 176. More specifically, the model damage data 148 may be represented as or further include a plurality of individual visual files 158, as shown for example in FIG. 7, depicting one or more of the theoretical damage values 150 for each of the structural components 116 in graphic format. The method 166 may select the relevant visual files 158 based on the events log 154, and compile the selected visual files 158 to construct a visual model 160 of the frame 108, as shown for example in FIG. 8. The method 166 in block 178 may further map the compiled data to construct two-dimensional or three-dimensional visual models 160 of the frame 108. For instance, the visual files 158 or other model damage data 148 may be overlaid or superimposed onto preexisting models of the frame 108 to construct the visual models 160.

Once a visual model 160 has been generated, the method 166 of FIG. 9 may display the visual model 160 on a display device 130 of any of the workstations 104 within the associated network in block 180. The method 166 may also output the visual model 160 in varying formats and in varying degrees of complexity specifically designed for different types of workstations 104. Although the visual model 160 in FIG. 8 is provided in a three-dimensional view and color-coded, other views and coding schemes may also be used. Furthermore, the method 166 may assess the measured damage values 146 and generate the visual model 160 in real-time, for example, approximately within, but not limited to, 2-3 hours of processing time for a frame 108. Any one or more of the processes of the method 166 of FIG. 9 may repeated for each work cycle, at predefined periods, upon demand by an operator, or at any other interval.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A visualization system for visualizing structural integrity of a frame, comprising:
 a monitoring device having one or more sensors coupled to the frame, the one or more sensors configured to measure field damage data; and
 a workstation in communication with the one or more sensors having:
 a display device,
 an analytical model database storing model damage data, the model damage data including theoretical damage values predetermined for one or more structural components associated with the frame for each of a plurality of possible events, and
 a controller configured to:
 receive the field damage data from the one or more sensors,
 receive the model damage data from the analytical model database,
 optimize the model damage data based on the field damage data,
 generate an events log based on the field damage data and the optimized model damage data,
 map the optimized model damage data to a visual model of the frame based on the events log, and
 display the visual model of the frame on the display device.

2. The visualization system of claim 1, wherein each of the monitoring device and the workstation includes a communication device configured to communicate the field damage data collected by the one or more sensors to the controller of the workstation.

3. The visualization system of claim 1, wherein the field damage data includes measured damage values for one or more locations of the frame in a given work cycle.

4. The visualization system of claim 3, wherein the events log includes one or more event coefficients indicative of the events that occurred during the work cycle and the number of times each of the events occurred during the work cycle.

5. The visualization system of claim 3, wherein the controller generates the events log based on a genetic algorithm configured to customize the model damage data based on the field damage data.

6. The visualization system of claim 3, wherein the model damage data further includes a plurality of visual files depicting each of the theoretical damage values for each of the locations, the controller compiling the visual files based on the events log to generate the visual model of the frame.

7. The visualization system of claim 1, wherein the controller generates the visual model in a plurality of different formats compatible with a plurality of different workstations.

8. A controller for visualizing structural integrity of a frame, comprising:
 a field data module configured to receive field damage data from one or more sensors coupled to the frame;
 a model data module configured to receive model damage data from an analytical model database, the model damage data including theoretical damage values predetermined for one or more structural components associated with the frame for each of a plurality of possible events;
an optimization module configured to optimize the model damage data based on the field damage data and to generate an events log based on the field damage data and the optimized model damage data; and
a compiler module configured to map the optimized model damage data to a visual model of the frame based on the events log.

9. The controller of claim 8, wherein the field damage data includes measured damage values for one or more locations of the frame in a given work cycle.

10. The controller of claim 9, wherein the optimization module generates the events log to include one or more event coefficients indicative of the events that occurred during the work cycle and the number of times each of the events occurred during the work cycle.

11. The controller of claim 9, wherein the optimization module generates the events log based on a genetic algorithm configured to customize the model damage data based on the field damage data.

12. The controller of claim 9, wherein the model damage data further includes a plurality of visual files depicting each of the theoretical damage values for each of the locations, and the compiler module compiles the visual files based on the events log to generate the visual model of the frame.

13. The controller of claim 8, further comprising a display module configured to display the visual model.

14. A method of visualizing structural integrity of a frame, comprising:
receiving field damage data from one or more sensors coupled to the frame;
receiving model damage data from an analytical model database, the model damage data including theoretical damage values predetermined for one or more structural components associated with the frame for each of a plurality of possible events;
optimizing the model damage data based on the field damage data;
generating an events log based on the field damage data and the optimized model damage data;
compiling a plurality of visual files of the optimized model damage data based on the events log; and
mapping the optimized model damage data to a visual model of the frame.

15. The method of claim 14, wherein the field damage data includes measured damage values for one or more locations of the frame in a given work cycle.

16. The method of claim 15, wherein the events log is generated to include one or more event coefficients indicative of the events that occurred during the work cycle and the number of times each of the events occurred during the work cycle.

17. The method of claim 15, wherein the events log is generated based on a genetic algorithm configured to customize the model damage data based on the field damage data.

18. The method of claim 15, wherein the visual files depict each of the theoretical damage values for each of the locations, and the visual model of the frame is generated by compiling the visual files based on the events log.

19. The method of claim 14, further displaying the visual model of the frame on a display device.

20. The method of claim 19, wherein the visual model is generated in a plurality of different formats compatible for display on a plurality of different display devices.

* * * * *